(12) United States Patent
Nakagawa

(10) Patent No.: US 11,278,803 B2
(45) Date of Patent: Mar. 22, 2022

(54) GAME PROGRAM AND GAME SYSTEM FOR PROVIDING VARIOUS PLAY STYLES BASED ON A SELECTED GAME CONTENT

(71) Applicant: SQUARE ENIX CO., LTD., Tokyo (JP)

(72) Inventor: Masaki Nakagawa, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/568,875

(22) Filed: Sep. 12, 2019

(65) Prior Publication Data

US 2020/0101380 A1 Apr. 2, 2020

(30) Foreign Application Priority Data

Sep. 27, 2018 (JP) .............................. JP2018-182597

(51) Int. Cl.
*A63F 13/00* (2014.01)
*A63F 13/45* (2014.01)
(Continued)

(52) U.S. Cl.
CPC ............ *A63F 13/45* (2014.09); *A63F 13/428* (2014.09); *A63F 13/56* (2014.09); *A63F 13/60* (2014.09)

(58) Field of Classification Search
CPC ........ A63F 13/35; A63F 13/45; A63F 13/556; A63F 13/822; A63F 13/352; A63F 13/40;
(Continued)

(56) References Cited

U.S. PATENT DOCUMENTS

| 4,010,954 A | * | 3/1977 | Uding | ................. A63F 3/00063 |
| | | | | 273/242 |
| 2007/0040330 A1 | * | 2/2007 | Robinson | ............ A63F 3/00697 |
| | | | | 273/243 |

(Continued)

FOREIGN PATENT DOCUMENTS

| JP | 2015-163262 | 9/2015 |
| JP | 2018-043160 | 3/2018 |

OTHER PUBLICATIONS

Flying, Feb. 23, 2017, wowwiki.fandom.com, <https://wowwiki.fandom.com/wiki/Flying?oldid=2820145> (Year: 2017).*

(Continued)

*Primary Examiner* — Justin L Myhr
(74) *Attorney, Agent, or Firm* — Greenblum & Bernstein, P.L.C.

(57) ABSTRACT

A game program causing a computer to implement a function of controlling progress of a game in which a user operates a player object in which an attribute is set causes the computer to implement an execution function of executing one game content selected from a plurality of game contents including a first game content and a second game content based on an operation input provided by the user, and a control function of controlling a motion of the player object in a game space based on the operation input provided by the user. In the control function, the computer implements a function of permitting the player object to execute a motion corresponding to the set attribute and prohibiting the player object from executing a motion corresponding to a non-set attribute during execution of the first game content.

7 Claims, 16 Drawing Sheets

(51) Int. Cl.
*A63F 13/56* (2014.01)
*A63F 13/428* (2014.01)
*A63F 13/60* (2014.01)

(58) Field of Classification Search
CPC ........ A63F 13/44; A63F 13/537; A63F 13/60;
A63F 13/69; A63F 2300/64; A63F 2300/807
See application file for complete search history.

(56) References Cited

U.S. PATENT DOCUMENTS

2014/0357359 A1* 12/2014 Kando .................... A63F 13/00 463/31
2016/0346697 A1* 12/2016 Tanabe ................... A63F 13/70
2019/0336863 A1* 11/2019 Hayashi .............. A63F 13/2145

OTHER PUBLICATIONS

Flying mounts, Mar. 24, 2016, wowwiki.fandom.com, <https://wowwiki.fandom.com/wiki/Flying_mounts?oldid=2792373> (Year: 2016).*
Warlords of Draenor, Dec. 11, 2017, wowwiki.fandom.com, <https://wowwiki.fandom.com/wiki/World_of_Warcraft:_Warlords_of_Draenor?oldid=2836730> (Year: 2017).*
Realm, Nov. 4, 2017, wowwiki.fandom.com, <https://wowwiki.fandom.com/wiki/Realm?oldid=2835222> (Year: 2017).*
Office Action from Japan Patent Office (JPO) in Japanese Patent Appl. No. 2018-182597, dated Sep. 24, 2019, together with an English language translation.

* cited by examiner

FIG.10

PROBABILITY TABLE

| NUMBER OF ITEMS | PROBABILITY OF SUCCESS |
|---|---|
| 1 | 100% |
| 2 | 90% |
| 3 | 60% |
| 4 | 35% |
| 5 | 15% |
| 6 | 5% |

FIG.12

USER DATA

| USER ID | CHARACTER STATUS | | | | | ... | POSSESSED ITEM | ... |
|---|---|---|---|---|---|---|---|---|
| | CHARACTER ID | NAME | PARA METER | PC JOB | PERMITTED MOTION | | | |
| J01-0001 | SR001 | MIKE | * | AT001 | S01, S02, *, A02-600, ... | ... | *,*, AI-A01B01, AI-A01FFF,... | ... |

FIG.13

JOB LIST

| JOB ID | NAME | JOB MOTION |
|---|---|---|
| AT001 | KNIGHT | S01,S02,··· |
| * * * | * * * | * * * |
| * * * | * * * | * * * |
| SO001 | BLACK MAGICIAN | A01,A02,··· |
| SO002 | WHITE MAGICIAN | W01,W02,··· |
| * * * | * * * | * * * |

MOTION LIST

| MOTION ID | NAME | MOTION DATA | IMAGE DATA |
|---|---|---|---|
| A01 | BLIZZARD | MOTION A01 | ICON A01 |
| A02 | BLIZZARA | * * * | * * * |
| * * * | * * * | * * * | * * * |
| * * * | * * * | * * * | * * * |
| * * * | * * * | * * * | * * * |

．
．
．

| S01 | FAST BLADE | * * * | * * * |

ITEM GENERATION TABLE

| SET MOTION | MATERIAL 1 | MATERIAL 2 | MATERIAL 3 |
|---|---|---|---|
| A01 | SI001 (MATERIAL ITEM α) | FFF | FFF |
| A02 | SI002 (MATERIAL ITEM β) | FFF | FFF |
| * * * | * * * | * * * | * * * |
| * * * | * * * | * * * | * * * |
| * * * | * * * | * * * | * * * |

．
．
．

GAME PROGRAM AND GAME SYSTEM FOR PROVIDING VARIOUS PLAY STYLES BASED ON A SELECTED GAME CONTENT

BACKGROUND OF THE INVENTION

1. Field of the Invention

At least one embodiment of the present invention relates to a game program and the like causing a computer to implement a function of controlling progress of a game in which a user operates a player object in which an attribute is set.

2. Description of Related Art

In recent years, an online game such as a massively multiplayer online role-playing game (MMORPG) has been provided to a game apparatus (terminal apparatus) from a game server apparatus through a communication network (for example, refer to JP-A-2015-163262 (JP-2015-99158)).

In the online game, version updates such as addition of new contents are periodically performed in order to enable the user to continuously play for a long period. For example, new contents include contents in which a task of defeating a new enemy in a new game space is set.

SUMMARY OF THE INVENTION

In such a game, even in a case where new contents are added by a version update of software, a change in operation method and the like is small, and a play style of the user basically does not change. For example, even in the contents of defeating a new enemy in a new game space, a motion and the like performed by a player character of the user are not changed. Thus, the user may desire to diversify the play style. In this case, it is considered that the motion and the like of the player character are simply changed by the version update and the like. However, a problem such as a change in worldview of the game may arise.

Particularly, in a role-playing game and the like, a plurality of parameters such as an attribute are set in the player character. For example, each parameter changes depending on the play of the user. Thus, a difference (individuality) is present between player characters of users. Accordingly, simply changing the motion and the like of the player character may affect the difference between player characters.

An object of at least one embodiment of the present invention is to resolve a deficiency of relevant technologies.

From a non-limiting viewpoint, a game program according to one embodiment of the present invention is a game program causing a computer to implement a function of controlling progress of a game in which a user operates a player object in which an attribute is set. The program causes the computer to implement an execution function of executing one game content selected from a plurality of game contents including a first game content and a second game content based on an operation input provided by the user, and a control function of controlling a motion of the player object in a game space based on the operation input provided by the user. In the control function, the computer implements a function of permitting the player object to execute a motion corresponding to the set attribute and prohibiting the player object from executing a motion corresponding to a non-set attribute during execution of the first game content, and a function of permitting the player object to execute the motion corresponding to the set attribute and permitting the player object to execute the motion corresponding to the non-set attribute depending on establishment of a predetermined condition during execution of the second game content.

From a non-limiting viewpoint, a game program according to one embodiment of the present invention is a game program causing a server apparatus connected through a communication network to a terminal apparatus executing a game in which a user operates a player object in which an attribute is set, to control progress of the game. The program causes the server apparatus to implement an execution function of executing one game content selected from a plurality of game contents including a first game content and a second game content based on an operation input provided by the user, and a control function of controlling a motion of the player object in a game space based on the operation input provided by the user. In the control function, the server apparatus implements a function of permitting the player object to execute a motion corresponding to the set attribute and prohibiting the player object from executing a motion corresponding to a non-set attribute during execution of the first game content, and a function of permitting the player object to execute the motion corresponding to the set attribute and permitting the player object to execute the motion corresponding to the non-set attribute depending on establishment of a predetermined condition during execution of the second game content.

From a non-limiting viewpoint, a game system according to one embodiment of the present invention is a game system including a terminal apparatus that executes a game in which a user operates a player object in which an attribute is set, and a server apparatus that is connected to the terminal apparatus through a communication network. The system includes an executor configured to execute one game content selected from a plurality of game contents including a first game content and a second game content based on an operation input provided by the user, and a controller configured to control a motion of the player object in a game space based on the operation input provided by the user. The controller permits the player object to execute a motion corresponding to the set attribute and prohibits the player object from executing a motion corresponding to a non-set attribute during execution of the first game content, and permits the player object to execute the motion corresponding to the set attribute and permits the player object to execute the motion corresponding to the non-set attribute depending on establishment of a predetermined condition during execution of the second game content.

One or two or more deficiencies are resolved by each embodiment of the present application.

BRIEF DESCRIPTION OF THE DRAWINGS

FIG. 10 is a diagram illustrating one example of a probability table corresponding to at least one embodiment of the present invention.

FIG. 12 is a diagram illustrating one example of user data corresponding to at least one embodiment of the present invention.

FIG. 13 is a diagram illustrating one example of a job list corresponding to at least one embodiment of the present invention.

FIG. 14 is a diagram illustrating one example of a motion list corresponding to at least one embodiment of the present invention.

FIG. 15 is a diagram illustrating one example of an item generation table corresponding to at least one embodiment of the present invention.

DESCRIPTION OF EMBODIMENTS

Hereinafter, examples of embodiments of the present invention will be described with reference to the drawings. Various constituents in the example of each embodiment described below can be appropriately combined without contradiction and the like. In addition, a description of a content described as an example of a certain embodiment may not be repeated in another embodiment. In addition, contents of operations and processes not related to characteristic parts of each embodiment may not be described. Furthermore, the order of various processes constituting various flows described below may be changed without contradiction and the like in process contents.

First Embodiment

Figure 1:
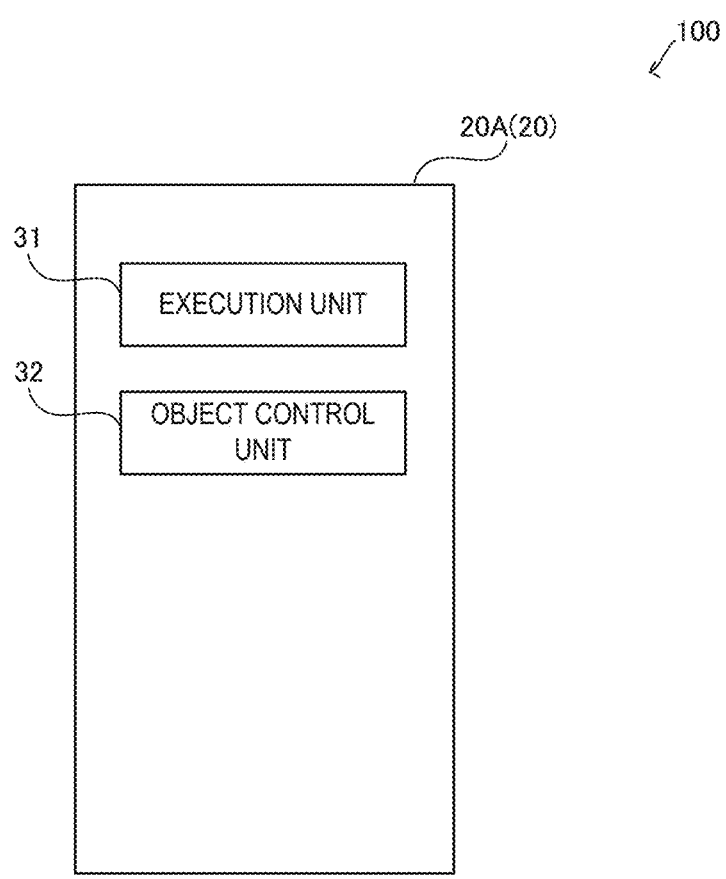
FIG. 1 is a block diagram illustrating an example of a configuration of a game system corresponding to at least one embodiment of the present invention.

FIG. 1 is a block diagram illustrating an example of a configuration of a game system 100 corresponding to at least one embodiment of the present invention. As illustrated in FIG. 1, the game system 100 includes a single terminal apparatus (game terminal apparatus) 20 that is a computer used by a user (player). In FIG. 1, a configuration of a terminal apparatus 20A that is an example of a configuration of a terminal apparatus 20 is illustrated. In addition, the configuration of the game system 100 is not limited to the configuration. For example, a configuration (refer to FIG. 3) in which the terminal apparatus of the user is connected to a server apparatus (video game processing server) through a communication network and a video game service is provided to the terminal apparatus from the server apparatus may be used.

For example, the video game processing system 100 has various functions of executing a video game (game) in which the user operates a player object in which an attribute is set. The game of the example of the present embodiment is configured with a plurality of game contents including a first game content and a second game content. The user can select a game content that the user desires to play. The player object performs motions such as flying, running, and attack according to an operation of the user in a game space of the game content in execution.

In the example of the present embodiment, the player object can execute a motion corresponding to the set attribute. However, a motion corresponding to an attribute that is not set is prohibited in a part of the game contents. Specifically, in the first game content, the player object is permitted to execute the motion corresponding to the set attribute and is prohibited from executing the motion corresponding to the non-set attribute. In addition, in the second game content, the player object is permitted to execute the motion corresponding to the set attribute and is permitted to execute the motion corresponding to the non-set attribute depending on establishment of a predetermined condition.

For example, the predetermined condition includes use of an action item that is a virtual item by the player object (user). In this case, execution of at least one motion corresponding to the used action item may be permitted.

The terminal apparatus 20 is managed by the user playing the game. For example, the terminal apparatus 20 is configured with a terminal apparatus such as a stationary game apparatus, a personal computer, a mobile phone terminal or personal digital assistants (PDA), or a portable game apparatus that can execute the video game.

In addition, the terminal apparatus 20 includes an operation unit, a storage unit such as a hard disk drive, a control unit that is configured with a CPU and the like and generates a game image by executing the game, a display unit that displays the game image, and the like for executing the video game. Such a configuration of the terminal apparatus 20 is a general configuration and thus, will not be described in detail. In addition, in the terminal apparatus 20, software (game program) for executing the video game and controlling progress of the game is stored in the storage unit. The game program includes game data.

Next, the configuration of the terminal apparatus 20A which is an example of the configuration of the terminal apparatus 20 will be described. The terminal apparatus 20A includes at least an execution unit 31 and an object control unit 32 in order for the control unit to control the progress of the video game by executing the game program stored in the storage unit.

The execution unit (execution function or executor) 31 executes one game content selected from the plurality of game contents based on an operation input provided by the user. For example, information related to each game content may be included in the game data.

The object control unit (control function or controller) 32 controls the motion of the player object in the game space based on the operation input provided by the user. In addition, as described above, during the execution of the first game content, the object control unit 32 permits the player object to execute the motion corresponding to the set attribute and prohibits the player object from executing the motion corresponding to the non-set attribute. In addition, during the execution of the second game content, the object control unit 32 permits the player object to execute the motion corresponding to the set attribute and permits the player object to execute the motion corresponding to the non-set attribute depending on the establishment of the predetermined condition.

Next, the operation of the game system 100 (system 100) of the embodiment will be described.

Figure 2:
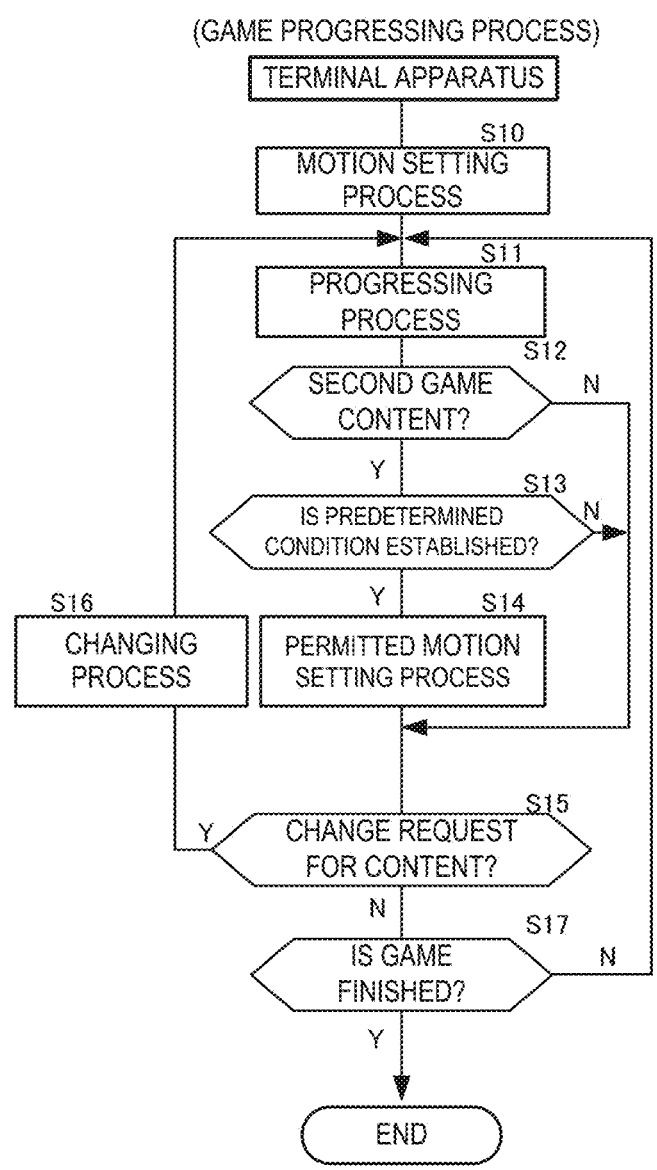
FIG. 2 is a flowchart illustrating an example of a game progressing process corresponding to at least one embodiment of the present invention.

FIG. 2 is a flowchart illustrating an example of a game progressing process executed by the system 100. In the game progressing process, a process for progressing (executing) the game content selected by the user is performed. Hereinafter, a case where the terminal apparatus 20A executes the game progressing process will be illustratively described. In FIG. 2, a process related to the motion of the player object in the game content is mainly illustrated, and other processes for the progress of the game are not illustrated.

For example, the game progressing process of the example of the present embodiment is executed by a trigger indicating that an operation input for selecting one game content is provided after the execution of the game is started by the user.

The terminal apparatus 20A performs a motion setting process (step S10). In the motion setting process, the motion permitted for the player object is set. Specifically, the motion corresponding to the attribute set in the player object is set to be permitted. For example, identification information related to the permitted motion may be stored in the storage unit of the terminal apparatus 20A as information related to the permission setting. In addition, in a case where the motion corresponding to the attribute set in the player object is already set to be permitted, the process of step S10 may not be executed.

Next, the terminal apparatus 20A performs a progressing process (step S11). The terminal apparatus 20A performs the progressing process of the game based on the game content selected by the user. Specifically, the motion of the player object in the game space of the game content is controlled based on the operation input provided to the operation unit by the user. For example, the permitted motion is executed.

Then, the terminal apparatus 20A determines whether or not the game content in execution (in progress) is the second game content (step S12). For example, the terminal apparatus 20A may perform the determination from identification information related to the game content in execution. In a case where the second game content is not in execution (step S12: NO), the terminal apparatus 20A transitions to a process of step S15.

In a case where the second game content is in execution (step S12: YES), the terminal apparatus 20A determines whether or not the predetermined condition is established (step S13). For example, in the case where the use of the action item is the predetermined condition, the determination is performed depending on whether or not the action item is used. In a case where the predetermined condition is not established (step S13: NO), the terminal apparatus 20A transitions to the process of step S15. In a case where the predetermined condition is established (step S13: YES), the terminal apparatus 20A performs a permitted motion setting process (step S14). In the permitted motion setting process, for example, the motion corresponding to the attribute not set in the player object is additionally set to be permitted.

Then, the terminal apparatus 20A determines whether or not a change request for the game content is made (step S15). For example, in a case where the user provides an operation input for changing the content, it may be determined that the change request for the content is made. In a case where the change request is made (step S15: YES), the terminal apparatus 20A performs a changing process (step S16). In the changing process, for example, a process of obtaining, from the storage unit, the game data and the like of the game content to be subsequently executed is performed. Then, a transition is made to the progressing process of step S11, and the game content to be subsequently executed is executed.

In a case where the change request is not made (step S15: NO), the terminal apparatus 20A determines whether or not the game is finished (step S17). That is, a determination as to whether or not the whole game including the game content is finished is performed. For example, in a case where the user provides an operation input for finishing the game, it may be determined that the game is finished. In a case where it is determined that the game is finished (step S17: YES), the terminal apparatus 20A finishes the game progressing process. In a case where it is determined that the game is not finished (step S17: NO), the terminal apparatus 20A returns to the progressing process of step S11 and progresses the game content in execution.

As described thus far, as one aspect of the first embodiment, the configuration in which the terminal apparatus 20A includes the execution unit 31 and the object control unit 32 is used. Thus, the player object may be permitted to execute the motion corresponding to the non-set attribute depending on the executed game content. That is, diversification of a play style is permitted in a part of the game contents. Accordingly, the user desiring various play styles may select the game content in which the motion corresponding to the non-set attribute is permitted. The user not desiring various play styles may not play the game content in which the motion corresponding to the non-set attribute is permitted, or may not establish the predetermined condition. Accordingly, it is possible to diversify the play style by providing multiple choices to the player while reducing occurrence of a problem such as a change in worldview.

Figure 3:
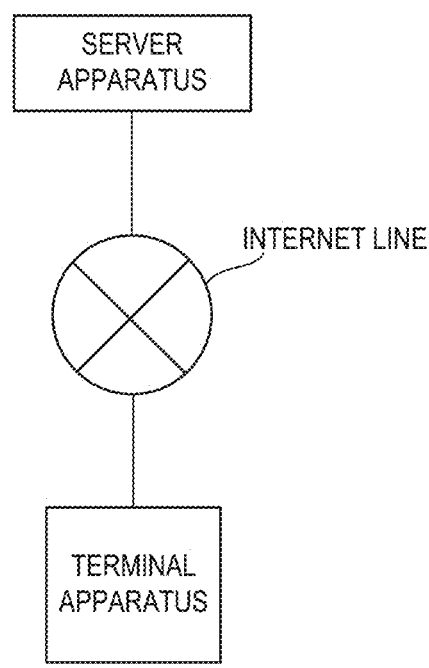
FIG. 3 is a block diagram illustrating an example of the configuration of the game system corresponding to at least one embodiment of the present invention.

In the example of the first embodiment, the terminal apparatus 20A controls the progress of the game by executing the game program. However, the example is not particularly for limitation purposes. For example, instead of the terminal apparatus 20A, a configuration in which the server apparatus includes at least the execution unit 31 and the object control unit 32 may be used as the game system including the server apparatus and the terminal apparatus as illustrated in FIG. 3.

For example, the server apparatus includes a storage unit such as a hard disk drive and a control unit configured with a CPU and the like, not illustrated. In addition, in the same manner as the terminal apparatus 20A, the server apparatus controls the progress of the video game by causing the control unit to execute the game program stored in the storage unit. While the server apparatus includes a general configuration such as the control unit and a communication unit for controlling the progress of the video game, such a configuration will not be described in detail.

The server apparatus does not execute the video game unlike the terminal apparatus 20A. For example, the server apparatus includes the communication unit connected to an Internet line (communication network) and communicates with the terminal apparatus executing the video game. The server apparatus receives an operation signal (operation information) and the like from the user (terminal apparatus) and transmits information (image information and the like) related to the progress of the game to the terminal apparatus. A plurality of server apparatuses may execute the game program in cooperation with each other, or the server apparatus and the terminal apparatus may execute the game program (control the progress of the game) in cooperation with each other.

Figure 4:
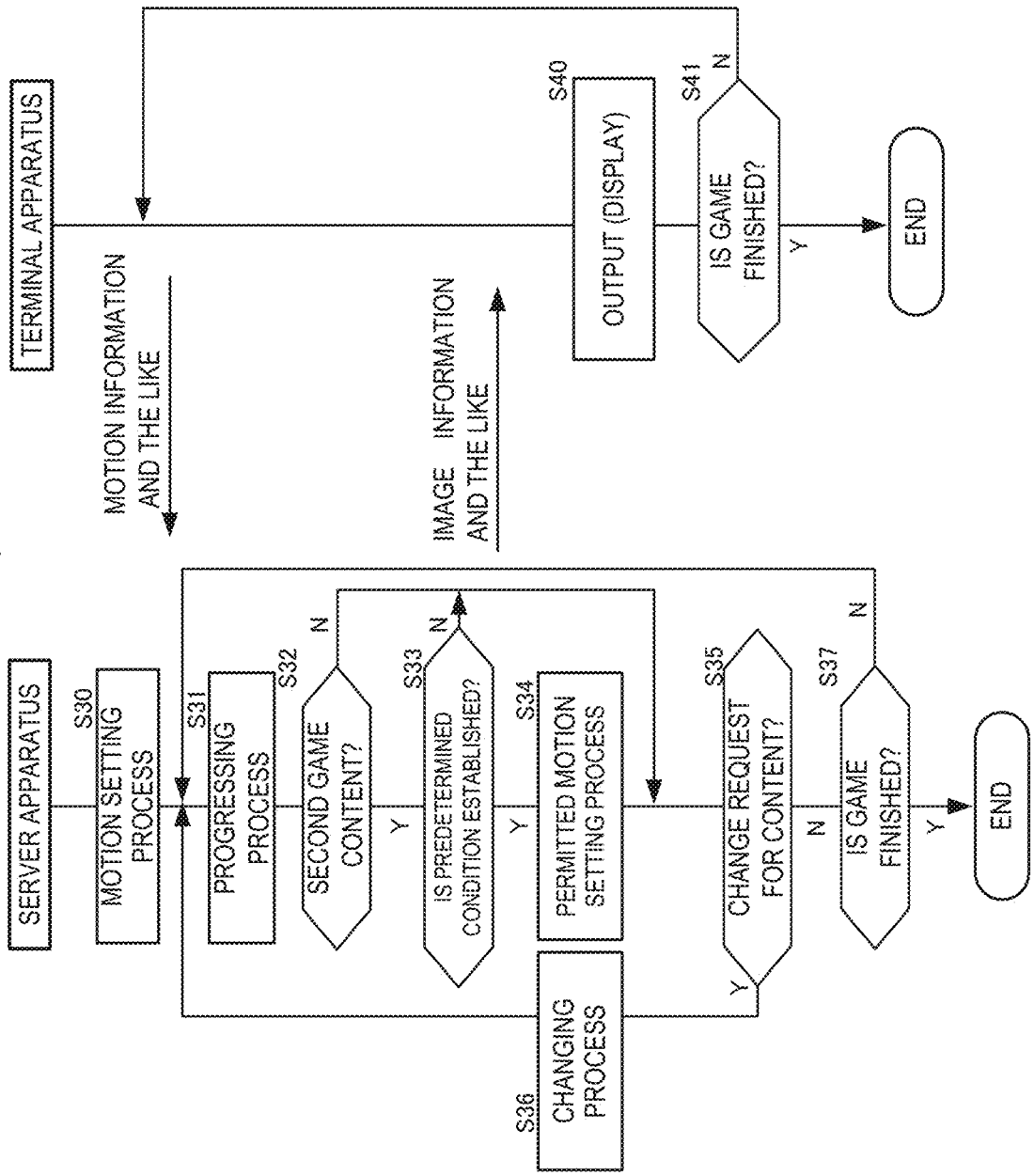
FIG. 4 is a flowchart illustrating an example of operation of a server apparatus and a terminal apparatus in a case where the server apparatus corresponding to at least one embodiment of the present invention executes the game progressing process.

FIG. 4 is a flowchart illustrating an example of the operation of the server apparatus and the terminal apparatus in a case where the server apparatus executes the game progressing process illustrated in FIG. 2. The server apparatus periodically receives the operation input (operation information) and the like of the operation unit from the terminal apparatus.

The server apparatus performs the motion setting process (step S30). In the motion setting process, the motion permitted for the player object is set. Specifically, the motion corresponding to the attribute set in the player object is set to be permitted. For example, the identification information related to the permitted motion may be stored in the storage unit of the server apparatus as information related to the permission setting. In addition, in a case where the motion corresponding to the attribute set in the player object is already set to be permitted, the process of step S30 may not be executed.

Next, the server apparatus performs the progressing process (step S31). The server apparatus performs the progressing process of the game based on the game content selected by the user. Specifically, the motion of the player object in the game space of the game content is controlled based on the operation input provided to the operation unit by the user. For example, the permitted motion is executed.

Then, the server apparatus determines whether or not the game content in execution (in progress) is the second game content (step S32). For example, the server apparatus may perform the determination from identification information related to the game content in execution. In a case where the second game content is not in execution (step S32: NO), the server apparatus transitions to a process of step S35.

In a case where the second game content is in execution (step S32: YES), the server apparatus determines whether or not the predetermined condition is established (step S33). For example, in the case where the use of the action item is the predetermined condition, the determination is performed depending on whether or not the action item is used. In a case where the predetermined condition is not established (step S33: NO), the server apparatus transitions to the process of step S35. In a case where the predetermined condition is established (step S33: YES), the server apparatus performs the permitted motion setting process (step S34). In the permitted motion setting process, for example, the motion corresponding to the attribute not set in the player object is additionally set to be permitted.

Then, the server apparatus determines whether or not the change request for the game content is made (step S35). For example, in a case where the user provides an operation input for changing the content, it may be determined that the change request for the content is made. In a case where the change request is made (step S35: YES), the server apparatus performs the changing process (step S36). In the changing process, for example, a process of obtaining the game data and the like of the game content to be subsequently executed is performed. Then, a transition is made to the progressing process of step S31, and the game content to be subsequently executed is executed.

In a case where the change request is not made (step S35: NO), the server apparatus determines whether or not the game is finished (step S37). In a case where it is determined that the game is finished (step S37: YES), the server apparatus finishes the game progressing process. In a case where it is determined that the game is not finished (step S37: NO), the server apparatus returns to the progressing process of step S31 and progresses the game content in execution.

The "player object" is an object operated by the user. For example, a character such as a person, a robot, and an animal, a vehicle such as an automobile, a spherical object such as a ball, and a card correspond to the player object.

The "attribute" of the player object means a property, a feature, and the like of the player object. For example, a profession (job), rarity, species, and a sex correspond to the attribute. The profession such as swordsman (knight), black magician, white magician, and fighter corresponds to the attribute. In addition, the "motion corresponding to the attribute" can employ any motion associated with the attribute. For example, an attack motion (skill) such as a special skill corresponds to the motion associated with the attribute. Specifically, in a case where the attribute corresponds to knight, a special skill (physical attack) using a sword may be set as the motion corresponding to the attribute. Furthermore, the "motion corresponding to the attribute" is not limited to one motion for one attribute. Two or more motions may be associated with one attribute.

The "game content" means a content constituting a part of the game. For example, a game field (game space) in which the player object is arranged and a dungeon correspond to the game content. In addition, for example, a mission (quest) in which a task (defeating an enemy, searching, and the like) to be achieved by the player object in a predetermined game space corresponds to the game content. Two or more game contents may be selected at the same time.

The "video game" may employ a game of any genre such as a role-playing game, a caring game, and a simulation game in a case where the configuration in which the user operates the player object in which the attribute is set is used. In addition, the "video game" may be configured such that the player object operated by each of a plurality of users is present in the same (common) game space like an MMORPG.

Second Embodiment

Figure 5:
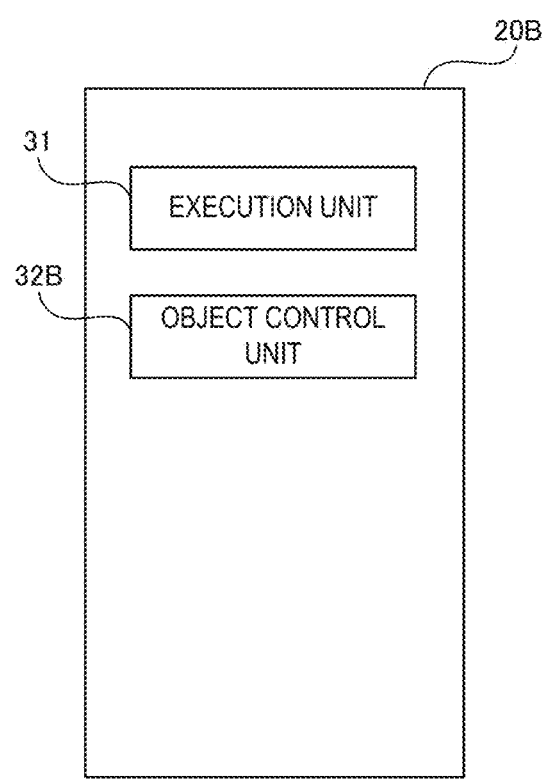
FIG. 5 is a block diagram illustrating an example of a configuration of the terminal apparatus corresponding to at least one embodiment of the present invention.

FIG. 5 is a block diagram illustrating a configuration of a terminal apparatus 20B that is an example of the terminal apparatus 20. In the present example, the terminal apparatus 20B includes at least the execution unit 31 and an object control unit 32B.

The execution unit 31 executes one game content selected from the plurality of game contents based on the operation input provided by the user. For example, information related to each game content may be included in the game data.

The object control unit 32B controls the motion of the player object in the game space based on the operation input provided by the user. In addition, during the execution of the first game content, the object control unit 32B permits the player object to execute the motion corresponding to the set attribute and prohibits the player object from executing the motion corresponding to the non-set attribute. In addition, during the execution of the second game content, the object control unit 32B permits the player object to execute the motion corresponding to the set attribute and permits the player object to execute the motion corresponding to the non-set attribute depending on the establishment of the predetermined condition.

In the example of the present embodiment, the predetermined condition includes the use of the action item by the player object (user). The action item is a virtual item that can be used in the game space. The object control unit 31B permits execution of at least one motion corresponding to the used action item. For example, in a case where one motion is associated with each type of action item, the player object is permitted to perform the one motion associated with the type of used action item. In this case, in a case where a plurality of types of items are used, the player object is permitted to perform a plurality of motions.

The motion corresponding to the attribute set in the player object is not permitted by the use of the action item.

Next, the operation of the game system 100 (system 100) of the embodiment will be described.

Figure 6:
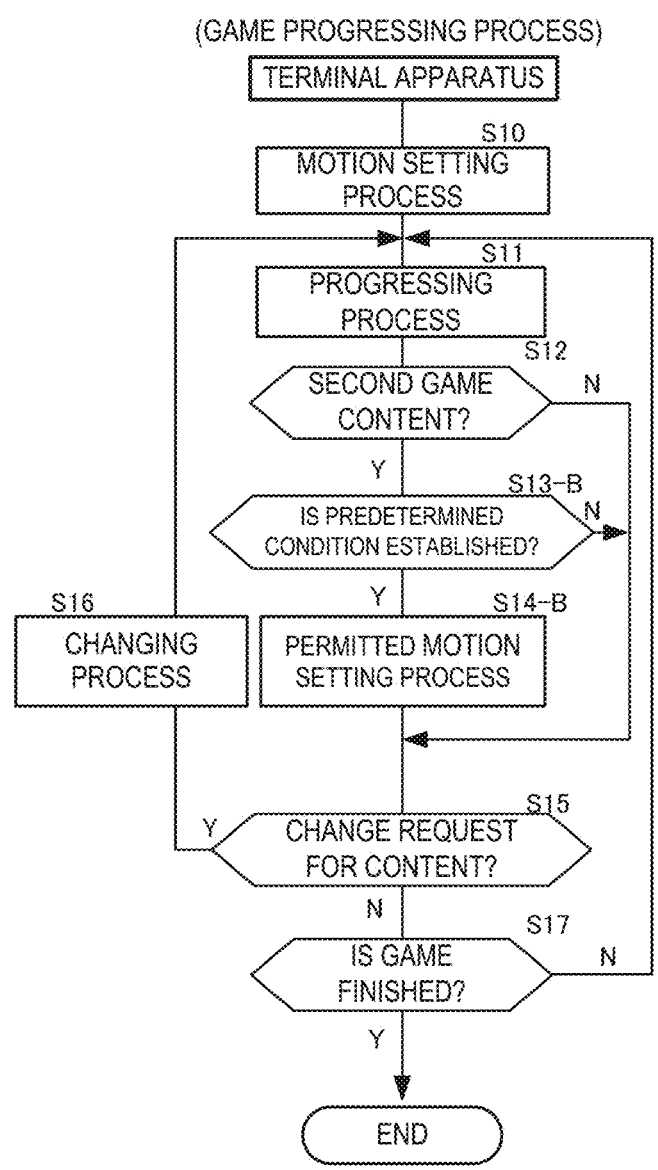
FIG. 6 is a flowchart illustrating an example of the game progressing process corresponding to at least one embodiment of the present invention.

FIG. 6 is a flowchart illustrating an example of the game progressing process executed by the system 100. In the game progressing process, a process for progressing (executing) the game content selected by the user is performed. Hereinafter, a case where the terminal apparatus 20B executes the game progressing process will be illustratively described. In FIG. 6, a process related to the permission of the motion of the player object in the game content is mainly illustrated, and other processes for the progress of the game are not illustrated. In addition, a flowchart illustrating the operation of the server apparatus is not illustrated from the viewpoint of avoiding a repeated description.

For example, the game progressing process of the example of the present embodiment is executed by a trigger indicating that an operation input for selecting one game content is provided after the execution of the game is started by the user.

The terminal apparatus 20B performs the motion setting process (step S10). In the motion setting process, the motion permitted for the player object is set. Specifically, the motion corresponding to the attribute set in the player object is set to be permitted. For example, identification information related to the permitted motion may be stored in the storage unit of the terminal apparatus 20B as information related to the permission setting. In addition, in a case where the motion corresponding to the attribute set in the player object is already set to be permitted, the process of step S10 may not be executed.

Next, the terminal apparatus 20B performs the progressing process (step S11). The terminal apparatus 20B performs the progressing process of the game based on the game content selected by the user. Specifically, the motion of the player object in the game space of the game content is controlled based on the operation input provided to the operation unit by the user. For example, the permitted motion is executed.

Then, the terminal apparatus 20B determines whether or not the game content in execution (in progress) is the second game content (step S12). For example, the terminal apparatus 20B may perform the determination from identification information related to the game content in execution. In a case where the second game content is not in execution (step S12: NO), the terminal apparatus 20B transitions to the process of step S15.

In a case where the second game content is in execution (step S12: YES), the terminal apparatus 20B determines whether or not the predetermined condition is established (step S13-B). In the example of the present embodiment, the determination is performed depending on whether or not the action item is used by the player object (user). In a case where the predetermined condition is not established (step S13-B: NO), the terminal apparatus 20B transitions to the process of step S15. In a case where the predetermined condition is established (step S13-B: YES), the terminal apparatus 20B performs a permitted motion setting process (step S14-B). As described above, at least one motion corresponding to the used action item is additionally set to be permitted. That is, the motion corresponding to the attribute not set in the player object can be executed by the same player object.

Then, the terminal apparatus 20B determines whether or not the change request for the game content is made (step S15). For example, in a case where the user provides an operation input for changing the content, it may be determined that the content change request is made. In a case where the change request is made (step S15: YES), the terminal apparatus 20B performs the changing process (step S16). In the changing process, for example, a process of obtaining the game data and the like of the game content to be subsequently executed is performed. Then, a transition is made to the progressing process of step S11, and the game content to be subsequently executed is executed.

In a case where the change request is not made (step S15: NO), the terminal apparatus 20B determines whether or not the game is finished (step S17). In a case where it is determined that the game is finished (step S17: YES), the terminal apparatus 20B finishes the game progressing process. In a case where it is determined that the game is not finished (step S17: NO), the terminal apparatus 20B returns to the progressing process of step S11 and progresses the game content in execution.

As described thus far, as one aspect of the second embodiment, the configuration in which the terminal apparatus 20B includes the execution unit 31 and the object control unit 32B is used. Thus, the player object may be permitted to execute the motion corresponding to the non-set attribute depending on the executed game content. That is, diversification of a play style is allowed in a part of the game contents. Accordingly, the user desiring various play styles may select the game content in which the motion corresponding to the non-set attribute is permitted. The user not desiring various play styles may not play the game content in which the motion corresponding to the non-set attribute is permitted, or may not establish the predetermined condition. Accordingly, it is possible to diversify the play style by providing multiple choices to the player while reducing occurrence of a problem such as a change in worldview.

In addition, in the second game content, the player object is permitted to execute the motion corresponding to the used action item. Thus, the play style can be changed for each user depending on the manner of using the action item.

For example, a user A1 causes a player object having an attribute A to execute a motion corresponding to an attribute B. In addition, a user A2 causes the player object having the attribute A to execute a motion corresponding to an attribute D. Even in a case where the player objects have the same attribute, the type of executable motion varies depending on the intention of the user. Accordingly, as described above, the play style is changed for each user.

Third Embodiment

Figure 7:
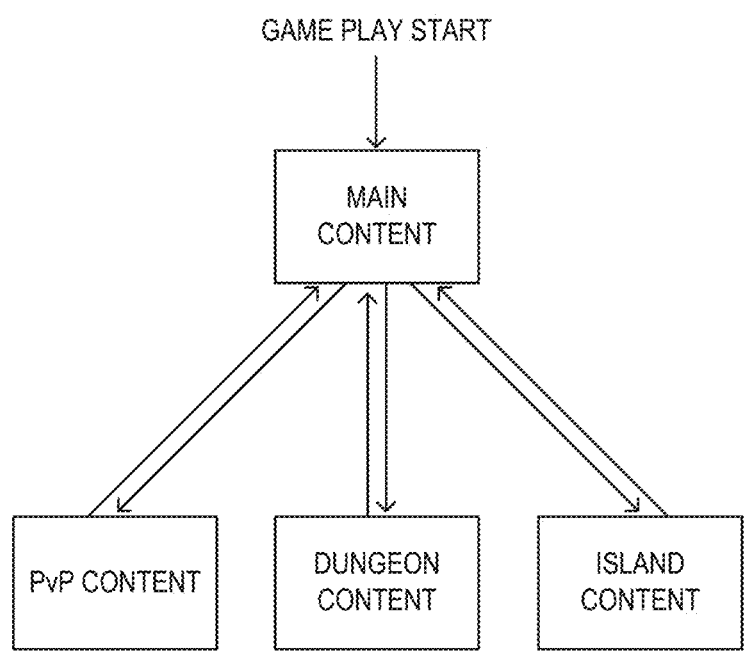
FIG. 7 is a diagram illustrating a summary of game contents corresponding to at least one embodiment of the present invention.

FIG. 7 is a diagram illustrating a summary of the game contents of the game of the example of the present embodiment. A terminal apparatus 20C that is an example of the terminal apparatus 20 provides the game having the plurality of game contents by executing the game program stored in the storage unit. The game of the example of the present embodiment is configured with game contents such as a main content, a PvP content, a dungeon content, and an island content.

The main content is a content having a task (purpose) in which the user (player) progresses a main story to the end by operating a player character (player object). More specifically, the main story is progressed by causing the player character to clear a plurality of missions (quests) prepared in the main content. For example, the mission is a sub-content in which a task (purpose) such as defeating a predetermined enemy character or obtaining a predetermined item is set. The player character can perform the permitted motion such as moving and attack in a three-dimensional virtual space (game space) for the main content. For example, the player character can start the mission by receiving a mission request from a predetermined non-player character. In the main content, the main story can also be progressed by cooperation with the player characters of other users through the communication network such as the Internet.

The PvP content is a content for fighting with the player characters of other users through the communication network such as the Internet. A task (purpose) of the PvP content is to win the fight. The dungeon content is a content for clearing the dungeon. A task (purpose) of the dungeon content is to progress the player character to the deepest level of the dungeon that is a three-dimensional virtual space (game space). For example, the dungeon is formed in 50 underground levels. The island content is a content having a task (purpose) of searching an island that is a three-dimensional virtual space (game space).

In the example of the present embodiment, the execution of the PvP content, the dungeon content, and the island content is started by causing the player character to speak to the predetermined non-player character in the game space of the main content. That is, when the play of the game is started, the game is started from the main content. Any one content of the PvP content, the dungeon content, and the island content is executed based on the operation input provided by the user. In addition, after the PvP content, the dungeon content, and the island content are finished, the main content is resumed.

The main content, the PvP content, and the dungeon content correspond to the first game content. In addition, the island content corresponds to the second game content.

In addition, the job which is the attribute is set in the player character of the example of the present embodiment. For example, the job includes swordsman (knight), ninja, minstrel, white magician, and black magician. The user can set one job for the player character. In addition, the user can change the job that is set once.

The player character can basically execute motion such as moving, speaking, and using a possessed item and a motion corresponding to the set job. The motion corresponding to the job includes the attack motion such as the special skill, a motion of restoring health of other player characters, a motion of buffing and debuffing, and the like. The player character is basically not permitted to perform a motion corresponding to a job that is different from the set job.

However, in the island content, the player character can execute the motion corresponding to the job different from the set job. Specifically, in the game space of the island content, the player character (user) can execute the motion corresponding to the job different from the set job using the action item.

The action item of the example of the present embodiment includes a plurality of types. One or more motions to be permitted are associated with each action item. The user (player character) can use a possessed action item. The used action item is removed. That is, the possessed action item can be used only once. For example, information related to the possessed action item is included in user data. The user data is information related to the game of the user (refer to FIG. 12).

Figure 8:
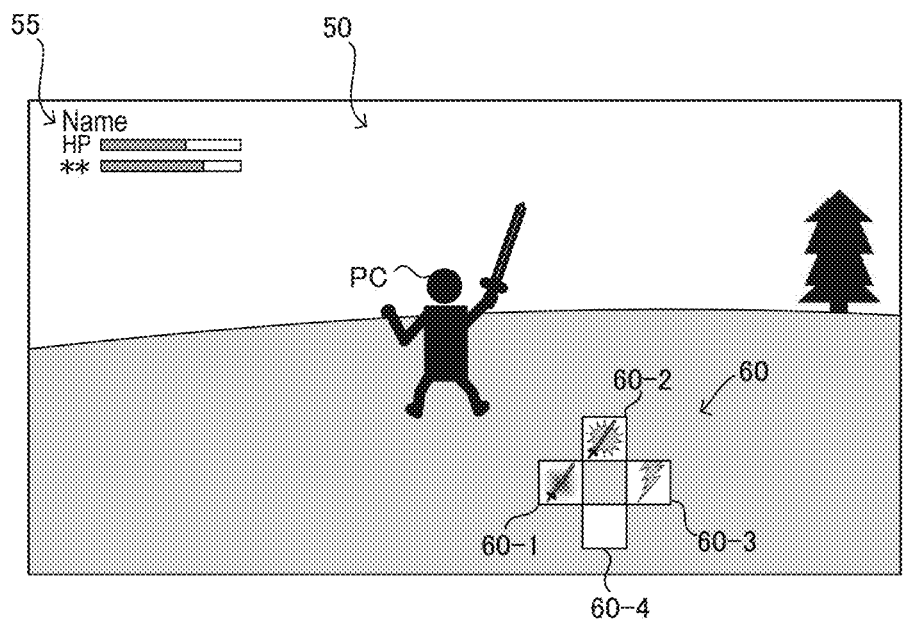
FIG. 8 is a diagram illustrating one example of a game image (game field) corresponding to at least one embodiment of the present invention.

FIG. 8 is a diagram illustrating one example of the game image during the execution of the island content. An image of a game space 50 with a player character PC at the center is included in the game image. In addition, in the game image, images of a status 55, an icon 60, and the like of the player character PC are overlaid on the image of the game space 50. The status 55 displays a current value and the like of the health (HP) of the player character PC. The icon 60 illustrates a part of motions permitted to be executed by the player character PC. The icon 60 of the example of the present embodiment illustrates the motion corresponding to the job set in the player character PC and the motion permitted to be executed by using the action item.

Each of icons 60-1 to 60-4 includes information (image) for specifying the type of permitted motion. Accordingly, the user can specify the motion permitted to be executed by the player character PC by checking the icons 60-1 to 60-4. The icon 60-4 illustrated in FIG. 8 illustrates a state where no motion is set. In addition, arrangement positions of the icons 60-1 to 60-4 show arrangement positions of four buttons of the operation unit of the terminal apparatus 20C. The user can cause the player character PC to execute the motion by pressing the corresponding button while visually recognizing the arrangement positions of the icons 60-1 to 60-4 in the game image.

In addition, the motion permitted by using the action item has a time limit (effective time). The execution of the motion is prohibited again after the time limit (for example 30 minutes) elapses from when the motion is permitted.

The action item is generated using one or more material items possessed by the user (player character). The material item includes a plurality of types. The generated action item varies depending on a combination of the material items (refer to FIG. 15). Information related to the possessed material item is also included in the user data like the action item. In addition, the material item is arranged in the game space of the island content. The player character PC can obtain the material item by moving to a position at which the material item is arranged. The obtained material item is set as a possessed item in the user data.

Figure 9:
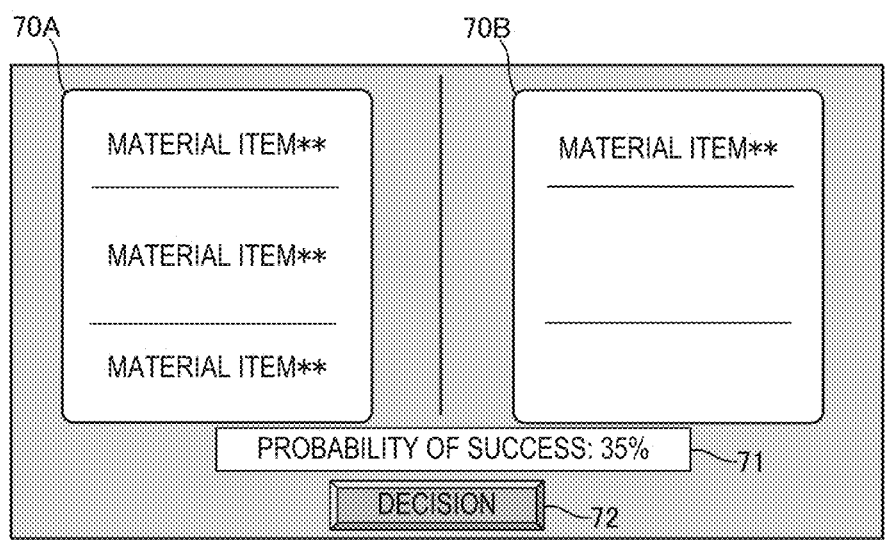
FIG. 9 is a diagram illustrating one example of a game image (action item generation image) corresponding to at least one embodiment of the present invention.

The generation of the action item is requested in a facility object that is arranged in the game space of the island content. In the facility object, in a case where start of the generation of the action item is requested from the user, an action item generation image (generation image) as illustrated in FIG. 9 is displayed as the game image.

The generation image is configured with material setting areas 70A and 70B, a probability display area 71, a decision icon 72, and the like. The material item selected by the user is displayed in the material setting areas 70A and 70B. Material items that are selection candidates are material items possessed by the user (player character).

The type of motion associated with the action item is decided in each of the material setting areas 70A and 70B. One motion is decided from a combination of material items in the material setting area 70A, and one motion is decided from a combination of material items in the material setting area 70B. In a case where the decision icon 72 is selected in response to the operation input provided by the user, the action item is generated based on the material items set in the material setting areas 70A and 70B.

In a case where the decision icon 72 is selected in a state where the material item is set in each of the material setting areas 70A and 70B, one action item associated with two types of motions is generated. In a case where the decision icon 72 is selected in a state where the material item is set in any one of the material setting area 70A and the material setting area 70B, one action item associated with one type of motion is generated.

Accordingly, the type and number of motions associated with the action item are decided based on the combination of the material items set in the material setting areas 70A and 70B. In the example of the present embodiment, maximum three material items can be set in each of the material setting areas 70A and 70B.

The probability of success in generating the action item is displayed in the probability display area 71. As illustrated in the probability table in FIG. 10, the probability of success changes depending on the number of material items used in generation performed once. The probability table is configured with fields such as the number of items and the probability of success. The number of material items used in the generation of the action item performed once is set in the field of the number of items. The probability of success associated with the number of items is set in the field of the probability of success. In the example of the present embodiment, the probability of success is decreased as the number of material items is increased. In the example of the present embodiment, the probability of success is decided depending on the total number of material items in the material setting areas 70A and 70B. For example, the generation image illustrated in FIG. 9 corresponds to a state where four material items are used in generation. Thus, the probability of success is 35%.

Figure 11:
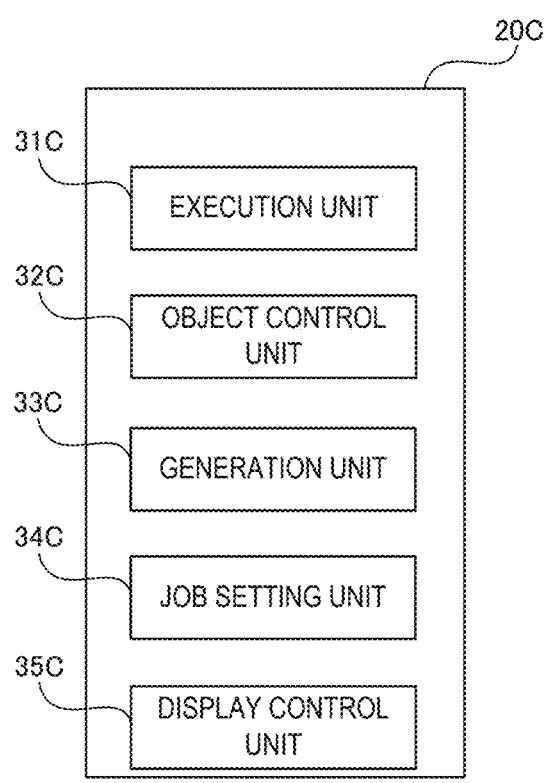
FIG. 11 is a block diagram illustrating an example of the configuration of the terminal apparatus corresponding to at least one embodiment of the present invention.

FIG. 11 is a block diagram illustrating a configuration of the terminal apparatus 20C which is an example of the terminal apparatus 20. In the example of the present embodiment, the terminal apparatus 20C includes at least an execution unit 31C, an object control unit 32C, a generation unit 33C, a job setting unit 34C, and a display control unit 35C.

The execution unit 31C executes one game content selected from the plurality of game contents (the main content, the PvP content, the dungeon content, and the island content) based on the operation input provided by the user. For example, information related to each game content is included in the game data.

The object control unit 32C controls the motion of the player object (player character PC) in the game space based on the operation input provided by the user. During the execution of the first game content (the main content, the PvP content, and the dungeon content), the object control unit 32C permits the player character PC to execute the motion corresponding to the set job and prohibits the player character PC from executing a motion corresponding to a non-set job. In addition, during the execution of the second game content (island content), the object control unit 32C permits the player PC to execute the motion corresponding to the set job and permits the player character PC to execute the motion corresponding to the non-set job depending on the establishment of the predetermined condition.

As described above, the predetermined condition includes the use of the action item by the player character PC (user). That is, the object control unit 32C permits the execution of the motion corresponding to the used action item. Information related to the motion permitted to be executed is included in the user data.

FIG. 12 is a diagram illustrating one example of the user data. The user data is information related to the game of the user and is stored in the storage unit of the terminal apparatus 20C. The terminal apparatus 20C updates the user data depending on the progress of the game. The user data is configured with fields such as a user ID, a character status, and a possessed item.

Identification information (user ID) related to the user is set in the field of the user ID. Various information related to the player character PC is set in the field of the character status. The field of the character status is configured with fields such as a character ID, a name, a parameter, a PC job, and a permitted motion. Identification information (character ID) related to the character is set in the field of the character ID. Text data of the name of the player character PC is set in the field of the name. Various parameters (numerical value information) of the character (character ID) such as the maximum value and the current value of health (HP) and attack power are set in the field of the parameter.

Identification information (job ID) related to the job of the player character PC is set in the field of the PC job. The identification information related to the permitted motion for the player character PC is set in the field of the permitted motion. In addition, information related to the time limit is set in the field of the permitted motion in association with the identification information related to the permitted motion.

FIG. 13 is a diagram illustrating one example of a job list. The job list shows information related to jobs that can be set in the player character. The job list is configured with fields such as a job ID, a name, and a job motion. The identification information (job ID) related to each job is set in the field of the job ID. The name and the job motion are associated with each job ID. Text data of the name of the job (job ID) is set in the field of the name. Identification information (motion ID) related to the motion corresponding to the job (job ID) is set in the field of the job motion. For example, the player character PC in which the job of black magician (job ID: SO001) is set is permitted to perform motions having the motion ID: A01, A02, and the like.

FIG. 14 is a diagram illustrating one example of a motion list. The motion list shows information related to motions that can be executed by the player character. The motion list is configured with fields such as the motion ID, a name, motion data, and image data. The identification information (motion ID) related to each motion is set in the field of the motion ID. The name, the motion data, and the image data are associated with each motion ID.

Text data of the name of the motion (motion ID) is set in the field of the name. Information and the like for specifying motion data of the player character for the motion (motion ID) are set in the field of the motion data. The motion of the player character PC is controlled based on the motion data. Information and the like for specifying the image of the icon 60 of the motion (motion ID) are set in the field of the image data. Accordingly, the image of the icon 60 is displayed as illustrated in FIG. 8.

The object control unit 32C obtains information (job ID) related to the job of the player character PC from the user data (PC job) and obtains the motion ID corresponding to the job ID from the job list. The object control unit 32C sets the obtained motion ID as the permitted motion of the user data. In addition, in a case where the action item is used, the object control unit 32C additionally sets the motion ID associated with the action item as the permitted motion of the user data along with information related to the time limit. For example, a motion having the motion ID: A02-600 in the permitted motion in FIG. 12 is a motion permitted by using the action item. A numerical value of a counter is denoted by "600". The object control unit 32C decreases the numerical value of the counter and removes the motion (motion ID) of which the numerical value of the counter is zero from the user data (permitted motion).

Next, returning to FIG. 12, identification information (item ID) related to the item possessed by the user (player character) is set in the field of the possessed item. For example, identification information related to the action item, the material item, and the like possessed by the user is set. The identification information related to the permitted motion is also associated with the identification information related to the action item.

For example, in the item ID: AI-A01B01 in the possessed item in FIG. 12, "AI" denotes information for identifying the action item, and "A01" and "B01" denote the identification information (motion ID) related to the permitted motion. That is, two motions (motion ID: A01 and B01) are permitted by using the action item having the item ID: AI-A01B01. In the case of the action item permitting only one motion, information (for example, "FFF") indicating that the motion ID is not present is included. For example, only one motion (motion ID: A01) is permitted by using the action item having the item ID: AI-A01FFF.

The object control unit 32C specifies the permitted motion by referring to the motion ID included in the item ID of the used action item.

An item list (not illustrated) is referred to for information related to various items. Various information is set in the item list in association with the item ID. The item list may be included in the game data.

Next, returning to FIG. 11, the generation unit 33C generates the action item at a predetermined probability from one or more material items obtained by the player character PC in the game space of the second game content (island content). As described above, in a case where the generation of the action item is requested (decision icon 72 is selected) in the facility object of the game space, the generation unit 33C performs random selection based on the probability table illustrated in FIG. 10. In a case where the random selection result indicates a success, the generation unit 33C generates the action item using the material items set in the material setting areas 70A and 70B. At this point, the generation unit 33C generates the action item by referring to an item generation table.

FIG. 15 is a diagram illustrating one example of the item generation table. In the item generation table, a relationship between a combination of material items for generating the action item and the motion is associated. The item generation table is configured with fields such as a set motion, a material 1, a material 2, and a material 3.

The identification information (motion ID) related to the motion associated with the action item is set in the field of the set motion. The materials 1 to 3 are associated with the set motion (motion ID). Information for specifying a combination of material items corresponding to the set motion (motion ID) is set in the fields of the materials 1 to 3. That is, identification information (item ID) related to the material item is set in the fields of the materials 1 to 3.

For example, in order to generate the action item having the item ID: AI-A01FFF, a material item α having the material ID: SI001 may be set in only the material setting area 70A. In addition, for example, in order to generate the action item having the item ID: AI-A01A02, the material item α having the material ID: SI001 may be set in the material setting area 70A, and a material item β having the material ID: SI002 may be set in the material setting area 70B.

In a case where the material items are not set in the fields of the materials 1 to 3, information (for example, "FFF") indicating that none is set is set. For example, the motion having the motion ID: A01 in FIG. 15 requires only one material item α (item ID: SI001), and "FFF" is set in the fields of the materials 2 and 3.

The generation unit 33C additionally sets the generated action item (item ID) in the possessed item of the user data. In addition, the material item (item ID) used in the generation of the action item is removed from the possessed item of the user data. Even in a case where the generation of the action item fails, the material item (item ID) used in the generation of the action item is removed from the possessed item of the user data.

Next, returning to FIG. 11, the job setting unit 34C sets the job of the player character PC depending on the motion input provided by the user. In the example of the present embodiment, during the execution of the play of the game, for example, the user can change the setting of the job of the player character PC any number of times by causing the player character PC to speak to a predetermined non-player character. The user can select the job by operating the operation unit on a screen in which all jobs are displayed. The job setting unit 34C sets (changes) the job ID of the selected job in the PC job of the user data.

The display control unit 35C generates the game image corresponding to the progress status of the game as illustrated in FIG. 8 and FIG. 9 and displays the game image on the display unit of the terminal apparatus 20C.

Next, the operation of the game system 100 (system 100) of the embodiment will be described.

Figure 16:
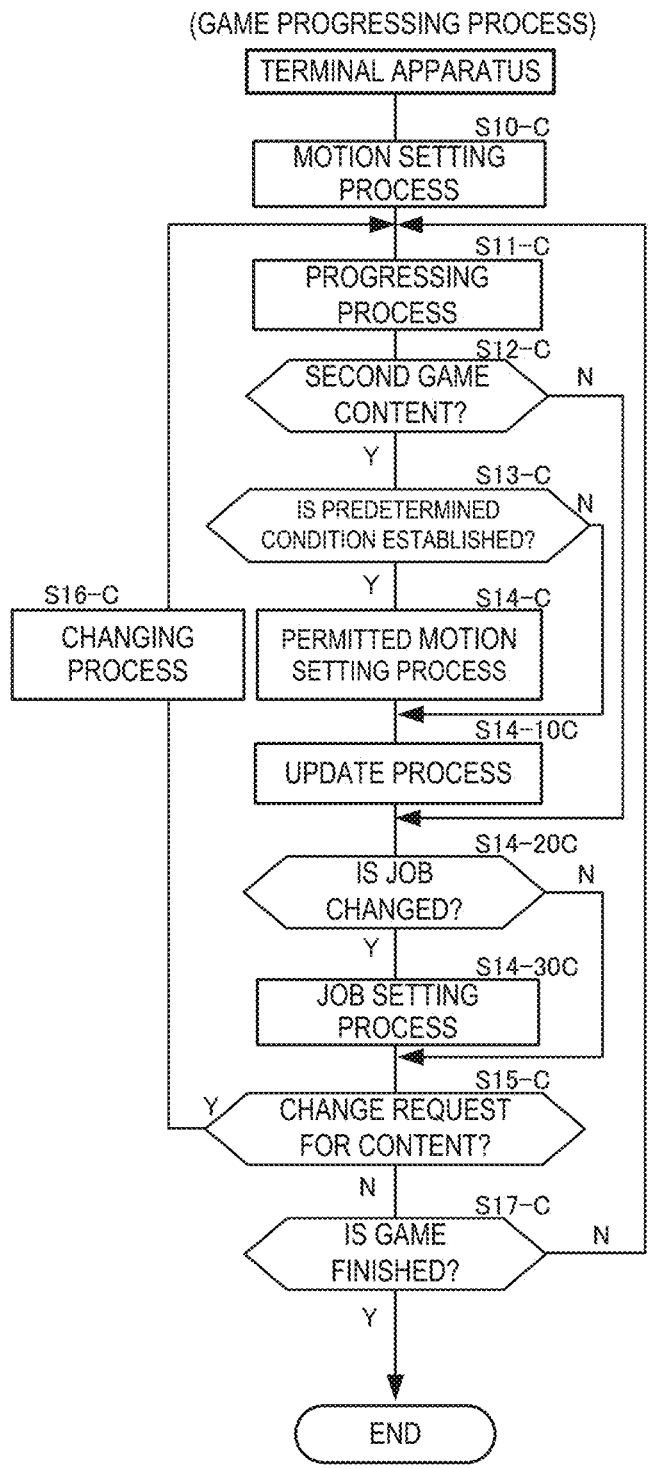
FIG. 16 is a flowchart illustrating an example of the game progressing process corresponding to at least one embodiment of the present invention.

FIG. 16 is a flowchart illustrating an example of the game progressing process executed by the system 100. In the game progressing process, a process for progressing (executing) the game content selected by the user is performed. Hereinafter, a case where the terminal apparatus 20C executes the game progressing process will be illustratively described. In FIG. 16, a process related to the permission of the motion of the player object in the game content is mainly illustrated, and other processes for the progress of the game are not illustrated. In addition, a flowchart illustrating the operation of the server apparatus is not illustrated from the viewpoint of avoiding a repeated description.

For example, the game progressing process of the example of the present embodiment is executed by a trigger indicating that an operation input for selecting one game content is provided after the execution of the game is started by the user. In the example of the present embodiment, as illustrated in FIG. 7, the operation input for starting the play of the game also corresponds to the operation input for selecting the main content.

The terminal apparatus 20C performs the motion setting process (step S10-C). In the motion setting process, the motion permitted for the player character PC is set. Specifically, the motion corresponding to the attribute set in the player object is set to be permitted. The terminal apparatus 20C sets the identification information (motion ID) related to the permitted motion in the user data (permitted motion) based on the job (PC job of the user data) of the player character PC, information related to the job list, and the like. In a case where the motion corresponding to the attribute set in the player object is already set to be permitted, the process of step S10-C may not be executed.

Next, the terminal apparatus 20C performs the progressing process (step S11-C). The terminal apparatus 20C performs the progressing process of the game based on one game content selected by the user. Specifically, the motion of the player character PC in the game space of the game content is controlled based on the operation input provided to the operation unit by the user.

In addition, in a case where the island content is executed, the generation of the action item in the facility object and the use of the action item are requested in the progressing process. In a case where the generation of the action item is requested, the material item is selected, and the random selection is performed at the probability based on the probability table. Then, the action item is generated in the generation image illustrated in FIG. 9. The generated action item (item ID) is additionally set in the user data (possessed item). In addition, in the progressing process, setting (change) of the job is requested in each content.

Furthermore, in the progressing process, in a case where the main content is executed, selection of another game content (content change request) is requested based on the operation input provided by the user. In a case where the selection of another game content is requested, the terminal apparatus 20C finishes the progressing process of the main content.

Then, the terminal apparatus 20C determines whether or not the game content in execution (in progress) is the second game content (island content) (step S12-C). For example, the terminal apparatus 20C may perform the determination from identification information related to the game content in execution. In a case where the island content is not in execution (step S12-C: NO), the terminal apparatus 20C transitions to a process of step S14-20C.

In a case where the island content is in execution (step S12-C: YES), the terminal apparatus 20C determines whether or not the predetermined condition is established (step S13-C). That is, a determination as to whether or not the action item is used is performed. In the progressing process, in a case where the use of the action item is requested, the terminal apparatus 20C determines that the action item is used. In a case where the action item is not used (step S13-C: NO), the terminal apparatus 20C transitions to a process of step S14-10C.

In a case where the action item is used (step S13-C: YES), the terminal apparatus 20C performs the permitted motion setting process (step S14-C). As described above, the motion ID and the time limit of the permitted motion are additionally set in the user data (permitted motion) based on the item ID of the used action item. In addition, information related to the used action item is removed from the user data (possessed item). Accordingly, the motion corresponding to the attribute not set in the player character PC can be executed by the same player character.

Next, the terminal apparatus 20C performs a time limit update process (step S14-10C). In the update process, the time limit (counter) of the motion ID in the permitted motion of the user data is updated. That is, the numerical value of the counter is decreased. In addition, the motion ID of the motion of which the numerical value of the counter is zero is removed from the user data (permitted motion). That is, the motion (motion ID) permitted by using the action item is prohibited from being executed again after the time limit is reached.

Next, the terminal apparatus 20C determines whether or not the job is changed (step S14-20C). In a case where setting of the job is requested in the progressing process, the terminal apparatus 20C determines that the job is changed. In a case where it is determined that the job is not changed (step S14-20C: NO), the terminal apparatus 20C transitions to a process of step S15-C.

In a case where it is determined that the job is changed (step S14-20C: YES), the terminal apparatus 20C performs a job setting process (step S14-30C). Specifically, the terminal apparatus 20C changes the setting of the user data (PC job) to the job ID of the selected job. In addition, in the job setting process, the motion ID of the motion corresponding to the changed job is set in the user data (permitted motion). At this point, the motion ID of the motion corresponding to the job before change is removed from the user data (permitted motion).

Then, the terminal apparatus 20C determines whether or not the change request for the game content is made (step S15-C). In a case where the selection of another game content is requested in the progressing process, the terminal apparatus 20C determines that the game content is changed. In a case where the change request is made (step S15-C: YES), the terminal apparatus 20C performs the changing process (step S16-C). In the changing process, for example, a process of obtaining, from the storage unit, the game data and the like of the game content to be subsequently executed is performed. Then, a transition is made to the progressing process of step S11-C, and the game content to be subsequently executed is executed.

In a case where the change request is not made (step S15-C: NO), the terminal apparatus 20C determines whether or not the game is finished (step S17-C). In a case where the user provides an operation input for finishing the game, it is determined that the game is finished. In a case where it is determined that the game is finished (step S17-C: YES), the terminal apparatus 20C finishes the game progressing process. In a case where it is determined that the game is not finished (step S17-C: NO), the terminal apparatus 20C returns to the progressing process of step S11-C and progresses the game content in execution.

As described thus far, as one aspect of the third embodiment, the configuration in which the terminal apparatus 20C includes the execution unit 31C, the object control unit 32C, the generation unit 33C, the job setting unit 34C, and the display control unit 35C is used. Thus, the player object (player character) may be permitted to execute the motion corresponding to the non-set attribute (job) depending on the executed game content. That is, diversification of a play style is allowed in a part of the game contents. Accordingly, the user desiring various play styles may select the game content in which the motion corresponding to the non-set attribute is permitted. The user not desiring various play styles may not play the game content in which the motion corresponding to the non-set attribute is permitted, or may not establish the predetermined condition. Accordingly, it is possible to diversify the play style by providing multiple choices to the player while reducing occurrence of a problem such as a change in worldview.

For example, like an online game, in a case where a new game content is added by performing a version update of the game program, the configuration of the second game content may be applied to the added game content.

In addition, in the second game content (island content), the player character is permitted to execute the motion corresponding to the used action item. Thus, the play style can be changed for each user depending on the manner of using the action item.

For example, the user A1 causes a player character having the attribute: knight to execute a motion (for example, an attacking magic spell) corresponding to the attribute: black magician. In addition, the user A2 causes the player character having the attribute: knight to execute a motion (for example, a magic spell restoring health (HP)) corresponding to the attribute: white magician. Even in a case where the player characters have the same attribute, the type of executable motion varies depending on the intention of the user. Accordingly, as described above, the play style is changed for each user.

In the example of the embodiments, the configuration in which other game contents are executed in a state where the main content is executed is used. However, the configuration is not particularly for limitation purposes. For example, in a case where the execution of the game is started, the user may select any content from the plurality of game contents including the main content. In addition, in the example of the embodiments, the island content which is one second game content is described. However, the number of second game contents may be two or more.

Furthermore, in the example of the embodiments, the predetermined time limit is set on the motion permitted by using the action item. However, the time limit is not particularly for limitation purposes. For example, the time limit may be set depending on the type of motion. In addition, for example, the time limit may be set depending on the number (number of use) of material items used in the generation of the action item. Specifically, as the number of use is increased, the time limit for the motion of the action item is extended. The time limit may not be set.

In addition, in the example of the embodiments, the user can change the setting of the job of the player character. However, the job of the player character may be set to be not changeable. For example, a change may not be requested after the job is decided in the decision of the player character.

APPENDIX

The embodiments are described such that those skilled in the field to which the invention belongs can embody at least the following invention.

[1]
A game program causing a computer to implement a function of controlling progress of a game in which a user operates a player object in which an attribute is set, the program causing the computer to implement an execution function of executing one game content selected from a plurality of game contents including a first game content and a second game content based on an operation input provided by the user, and a control function of controlling a motion of the player object in a game space based on the operation input provided by the user, in which in the control function, the computer implements a function of permitting the player object to execute a motion corresponding to the set attribute and prohibiting the player object from executing a motion corresponding to a non-set attribute during execution of the first game content, and a function of permitting the player object to execute the motion corresponding to the set attribute and permitting the player object to execute the motion corresponding to the non-set attribute depending on establishment of a predetermined condition during execution of the second game content.

[2]
The game program according to [1], in which the predetermined condition includes use of an action item by the player object, and in the control function, the computer implements a function of permitting execution of at least one motion corresponding to the used action item.

[3]
The game program according to [2], further causing the computer to implement a generation function of generating the action item at a predetermined probability from one or more material items obtained by the player object in a game space of the second game content.

[4]
The game program according to any one of [1] to [3], in which the game content is a content in which a task to be achieved by the player object in a predetermined game space is set.

[5]
The game program according to any one of [1] to [4], further causing the computer to implement a setting function of changing the setting of the attribute of the player object based on the operation input provided by the user.

[6]
A server apparatus on which the game program according to any one of [1] to [5] is installed.

[7]
A terminal program causing a terminal apparatus to implement a function of executing a video game by displaying a game image on a display screen of a display unit, the program causing the terminal apparatus to implement a connection function of connecting to the server apparatus according to [6] through a communication network.

[8]
A game program causing a server apparatus connected through a communication network to a terminal apparatus executing a game in which a user operates a player object in which an attribute is set, to control progress of the game, the program causing the server apparatus to implement an execution function of executing one game content selected from a plurality of game contents including a first game content and a second game content based on an operation input provided by the user, and a control function of controlling a motion of the player object in a game space based on the operation input provided by the user, in which in the control function, the server apparatus implements a function of permitting the player object to execute a motion corresponding to the set attribute and prohibiting the player object from executing a motion corresponding to a non-set attribute during execution of the first game content, and a function of permitting the player object to execute the motion corresponding to the set attribute and permitting the player object to execute the motion corresponding to the non-set attribute depending on establishment of a predetermined condition during execution of the second game content.

[9]
The game program according to [8], in which the predetermined condition includes use of an action item by the player object, and in the control function, the server apparatus implements a function of permitting execution of at least one motion corresponding to the used action item.

[10]
The game program according to [9], further causing the server apparatus to implement a generation function of generating the action item at a predetermined probability from one or more material items obtained by the player object in a game space of the second game content.

[11]
The game program according to any one of [8] to [10], in which the game content is a content in which a task to be achieved by the player object in a predetermined game space is set.

[12]
The game program according to any one of [8] to [11], further causing the server apparatus to implement a setting function of changing the setting of the attribute of the player object based on the operation input provided by the user.

[13]

A game system including a terminal apparatus that executes a game in which a user operates a player object in which an attribute is set, and a server apparatus that is connected to the terminal apparatus through a communication network, the system including an executor configured to execute one game content selected from a plurality of game contents including a first game content and a second game content based on an operation input provided by the user, and a controller configured to control a motion of the player object in a game space based on the operation input provided by the user, in which the controller permits the player object to execute a motion corresponding to the set attribute and prohibits the player object from executing a motion corresponding to a non-set attribute during execution of the first game content, and permits the player object to execute the motion corresponding to the set attribute and permits the player object to execute the motion corresponding to the non-set attribute depending on establishment of a predetermined condition during execution of the second game content.

[14]

The game system according to [13], in which the predetermined condition includes use of an action item by the player object, and the controller permits execution of at least one motion corresponding to the used action item.

[15]

The game system according to [14], further including a generator configured to generate the action item at a predetermined probability from one or more material items obtained by the player object in a game space of the second game content.

[16]

The game system according to any one of [13] to [15], in which the game content is a content in which a task to be achieved by the player object in a predetermined game space is set.

[17]

The game system according to any one of [13] to [16], further including a setter configured to change the setting of the attribute of the player object based on the operation input provided by the user.

[18]

A terminal apparatus that controls progress of a game in which a user operates a player object in which an attribute is set, the apparatus including an executor configured to execute one game content selected from a plurality of game contents including a first game content and a second game content based on an operation input provided by the user, and a controller configured to control a motion of the player object in a game space based on the operation input provided by the user, in which the controller permits the player object to execute a motion corresponding to the set attribute and prohibits the player object from executing a motion corresponding to a non-set attribute during execution of the first game content, and permits the player object to execute the motion corresponding to the set attribute and permits the player object to execute the motion corresponding to the non-set attribute depending on establishment of a predetermined condition during execution of the second game content.

[19]

A game progress control method causing a computer to control progress of a game in which a user operates a player object in which an attribute is set, the method including an execution process of executing one game content selected from a plurality of game contents including a first game content and a second game content based on an operation input provided by the user, and a control process of controlling a motion of the player object in a game space based on the operation input provided by the user, in which the control process includes a process of permitting the player object to execute a motion corresponding to the set attribute and prohibiting the player object from executing a motion corresponding to a non-set attribute during execution of the first game content, and a process of permitting the player object to execute the motion corresponding to the set attribute and permitting the player object to execute the motion corresponding to the non-set attribute depending on establishment of a predetermined condition during execution of the second game content.

One embodiment of the present invention is effective in diversifying a play style by providing multiple choices to a player while reducing occurrence of a problem such as a change in worldview in a game in which a user operates a player object in which an attribute is set.

What is claimed is:

1. A non-transitory computer-readable medium including a game program, the game program, when executed, causing a computer to implement functions for controlling progress of a game in which a user operates a first player object in which an attribute is set, the functions comprising:
   an execution function of executing the game, the game including a first three-dimensional virtual space and at least one second three-dimensional virtual space, a first task being set for performance in the first three-dimensional virtual space, at least one second task being set for performance in the second three-dimensional virtual space, the second task being performed during a progress of the first task based on an operation input provided by the user; and
   a control function of controlling a motion of the first player object in the first three-dimensional virtual space and the second three-dimensional virtual space based on the operation input provided by the user,
   wherein in the control function, the computer implements
      a first function of permitting the first player object to execute a first motion corresponding to the set attribute and prohibiting the first player object from executing a second motion corresponding to a non-set attribute during progress of the first task in the first three-dimensional virtual space, the first motion being predefined for the set attribute of the first player object in the game, the second motion being predefined for the non-set attribute in the game, at least one second player object having the non-set attribute and permitted to execute the second motion during the progress of the first task in the first three-dimensional virtual space, and
      a second function of permitting the first player object to execute the first motion corresponding to the set attribute and permitting the first player object to execute the second motion corresponding to the non-set attribute depending on establishment of a predetermined condition during progress of the second task in the second three-dimensional virtual space, and
   wherein the second motion corresponding to the non-set attribute, which is permitted to be executed during progress of the second task, is configured to be differently set by different players of the game.

2. The non-transitory computer-readable medium according to claim 1, wherein the predetermined condition includes use of an action item by the first player object, and in the control function, the computer permits execution of at least one motion corresponding to the used action item.

3. The non-transitory computer-readable medium according to claim 2, the functions further comprising:

a generation function of generating the action item at a predetermined probability from one or more material items obtained by the first player object in of the second three-dimensional virtual space.

4. The non-transitory computer-readable medium according to claim 1, wherein the second three-dimensional virtual space includes the second task to be achieved by the first player object.

5. The non-transitory computer-readable medium according to claim 1, the functions further comprising:

a setting function of changing the setting of the set attribute of the first player object based on the operation input provided by the user.

6. A non-transitory computer-readable medium including a game program, the game program, when executed, causing a server apparatus, connected through a communication network to a terminal apparatus executing a game in which a user operates a first player object in which an attribute is set, to control progress of the game, the game program causing the server apparatus to implement functions, the functions comprising:

an execution function of executing the game, the game including a first three-dimensional virtual space and at least one second three-dimensional virtual space, a first task being set for performance in the first three-dimensional virtual space, at least one second task being set for performance in the second three-dimensional virtual space, the second task being performed during a progress of the first task based on an operation input provided by the user; and a control function of controlling a motion of the first player object in the first three-dimensional virtual space and the second three-dimensional virtual space based on the operation input provided by the user, wherein in the control function, the server apparatus implements a first function of permitting the first player object to execute a first motion corresponding to the set attribute and prohibiting the first player object from executing a second motion corresponding to a non-set attribute during progress of the first task in the first three-dimensional virtual space, the first motion being predefined for the set attribute of the first player object in the game, the second motion being predefined for the non-set attribute in the game, at least one player object having the non-set attribute and permitted to execute the second motion during the progress of the first task in the first three-dimensional virtual space, and a second function of permitting the first player object to execute the first motion corresponding to the set attribute and permitting the first player object to execute the second motion corresponding to the non-set attribute depending on establishment of a predetermined condition during progress of the second task in the second three-dimensional virtual space, and wherein the second motion corresponding to the non-set attribute, which is permitted to be executed during progress of the second task, is configured to be differently set by different players of the game.

7. A game system including a terminal apparatus that executes a game in which a user operates a first player object in which an attribute is set, and a server apparatus that is connected to the terminal apparatus through a communication network, the game system comprising:

a memory including a game program; and a processor that, when executing the program, implements functions, the functions including:

executing the game, the game including a first three-dimensional virtual space and at least one second three-dimensional virtual space, a first task being set for performance in the first three-dimensional virtual space, at least one second task being set for performance in the second three-dimensional virtual space, the second task being performed during a progress of the first task based on an operation input provided by the user; and controlling a motion of the first player object in the first three-dimensional virtual space and the second three-dimensional virtual space based on the operation input provided by the user, wherein the controlling permits the first player object to execute a first motion corresponding to the set attribute and prohibits the first player object from executing a second motion corresponding to a non-set attribute during progress of the first task in the first three-dimensional virtual space, the first motion being predefined for the set attribute of the first player object in the game, the second motion being predefined for the non-set attribute in the game, at least one player object having the non-set attribute and permitted to execute the second motion during the progress of the first task in the first three-dimensional virtual space, and permits the first player object to execute the first motion corresponding to the set attribute and permits the first player object to execute the second motion corresponding to the non-set attribute depending on establishment of a predetermined condition during progress of the second task in the second three-dimensional virtual space, and wherein the second motion corresponding to the non-set attribute, which is permitted to be executed during progress of the second task, is configured to be differently set by different players of the game.

* * * * *